United States Patent [19]

Wolff et al.

[11] 4,278,587

[45] Jul. 14, 1981

[54] VULCANIZABLE RUBBER MIXTURE BASED ON HALOGEN FREE RUBBER FOR VULCANIZING THESE RUBBER MIXTURES AND USE OF THE RUBBER MIXTURES

[75] Inventors: Siegfried Wolff, Bornheim-Merten; Ewe-Hong Tan, Bruhl, both of Fed. Rep. of Germany

[73] Assignee: Degussa Aktiengesellschaft, Frankfurt am Main, Fed. Rep. of Germany

[21] Appl. No.: 178,160

[22] Filed: Aug. 14, 1980

[30] Foreign Application Priority Data

Aug. 17, 1979 [DE] Fed. Rep. of Germany ....... 2933345

[51] Int. Cl.$^3$ ............................................... C08K 5/54
[52] U.S. Cl. ............................... 260/42.37; 260/42.15; 260/42.34
[58] Field of Search ............... 260/42.15, 42.32, 42.33, 260/42.34, 42.35, 42.36, 42.37; 556/446, 485, 486

[56] References Cited

U.S. PATENT DOCUMENTS

| | | | |
|---|---|---|---|
| 3,856,723 | 12/1974 | Vrisakis | 260/42.34 |
| 3,873,489 | 3/1975 | Thurn | 260/42.15 |
| 3,928,406 | 12/1975 | Leeper | 556/446 |
| 3,997,356 | 12/1976 | Thurn | 106/288 Q |
| 4,045,459 | 8/1977 | Foery | 556/446 |
| 4,072,701 | 2/1978 | Pletka | 260/448.8 R |
| 4,150,014 | 4/1979 | Edwards | 260/42.35 |
| 4,222,915 | 9/1980 | Wolff | 260/42.15 |
| 4,229,333 | 10/1980 | Wolff | 260/42.37 |

FOREIGN PATENT DOCUMENTS

| | | |
|---|---|---|
| 2255577 | 7/1976 | Fed. Rep. of Germany . |
| 2536674 | 2/1977 | Fed. Rep. of Germany . |
| 2542534 | 3/1977 | Fed. Rep. of Germany . |
| 1095219 | 12/1967 | United Kingdom . |
| 1201862 | 8/1970 | United Kingdom . |
| 1353532 | 5/1974 | United Kingdom . |

OTHER PUBLICATIONS

Rubber World, Oct. 1979, pp. 54–55.
2027635, 1971, Germany.
Society Plastics Engineers, 21st Annual Technical Conference, Mar., 1965, VII, pp. 1, 4, 5, 6, 12, 14.
832970, 1978, Belgian.

*Primary Examiner*—Paul R. Michl
*Attorney, Agent, or Firm*—Cushman, Darby & Cushman

[57] ABSTRACT

There is prepared a vulcanizable rubber mixture of a vulcanizable halogen free rubber or a mixture of a halogen free rubber with a maximum of 80% based on the weight of the total rubber of a halogen containing rubber, additionally a silicate filler in an amount of 1 to 250 parts by weight, an oxide of the metal zinc, magnesium or lead in an amount of 0 to 15 parts by weight, a monobasic fatty acid having 12 to 24 carbon atoms in the alkyl chain, benzoic acid or salicylic acid in an amount of 0 to 10 parts by weight, optionally sulphur and/or sulphur donor in an amount of 0.1 to 15 parts by weight, a vulcanization accelerator in an amount of 0.1 to 10 parts by weight, a plasticizer in an amount of 0 to 100 parts by weight, a stabilizer from the group of antiagers, fatigue inhibitors, antioxidants, light protective agents and ozone protective agents in an amount of 0 to 10 parts by weight of each, carbon black in an amount of 0 to 150 parts by weight, optionally additional customary rubber assistants in customary amounts and at least one organosilane in an amount of 0.1 to 20 parts by weight, the silane corresponding to the formula

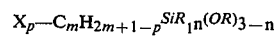

I in which
X is chlorine or bromine,
p is 1 or 2,
m is 1 to 5,
R$^1$ is a C$_1$–C$_5$-alkyl group, C$_5$–C$_8$-cycloalkyl group or the phenyl group,
R is a C$_1$–C$_5$-alkyl group, a C$_5$–C$_8$-cycloalkyl group, the methoxyethyl group, the phenyl group or the benzyl group and
n is 0, 1 or 2, or a hydrolysate and/or condensate of organosilane I, in which all stated amounts are based on 100 parts by weight of rubber.

76 Claims, No Drawings

VULCANIZABLE RUBBER MIXTURE BASED ON HALOGEN FREE RUBBER FOR VULCANIZING THESE RUBBER MIXTURES AND USE OF THE RUBBER MIXTURES

BACKGROUND OF THE INVENTION

The invention is directed to mouldable and vulcanisable rubber mixtures based on halogen free rubbers which contain as essential constituents besides the rubber which contains no halogen in the molecule, a silicate filler, optionally in admixture with the filler carbon black, optionally sulphur and/or sulphur donor, at least one vulcanisation accelerator and at least one organosilane with at least one alkoxysilyl group.

It is known to add a silica filler in place of carbon black in rubber mixtures based on so-called All-Purpose rubbers (for short AP rubbers, i.e. types of rubbers which have found the widest use for the best known areas of use as especially styrene-butadiene rubber, butadiene rubber, butadient-acrylonitrile rubber and natural rubber) limited by the following three property conditioned grounds.

1. In AP rubbers silica fillers at comparable specific surface areas as the carbon blacks produce considerably higher Mooney viscosities than carbon black.
2. Silica fillers negatively influence the vulcanisation kinetics and the crosslinking efficiency of the preferably employed accelerated sulphur vulcanisation with AP rubbers.
3. Silica fillers in rubber mixtures and vulcanisates have smaller effective rubber surface areas which are very strongly expressed in reduced efficiency, especially in abrasion resistance.

It is known that these important disadvantages can be overcome by the use of organosilanes in the rubber mixtures filled with silica fillers. Such organosilanes must be "bifunctional", i.e. have first a filler active function which customarily is exercised by alkoxysilyl groups and secondly have a rubber active function, which customarily is exercised by sulphur containing groups as the $-S_x-$ (X=2 to 6) and the $-SH$ groups. The last mentioned groups obviously share in the accelerated sulphur vulcanisation reactions.

Well suited organosilanes for example are the outstanding suited bis-(alkoxysilylalkyl)-oligosulphides as for example bis-(triethoxysilylpropyl)-tetrasulphide (German patent 2,255,577 and related Thurn U.S. Pat. No. 3,873,489). An alternative to the separate addition of silicate fillers and silanes to the rubber mixtures consists of the premixes of the mentioned materials (Thurn U.S. Pat. No. 3,997,356). (The entire disclosures of both Thurn U.S. patents are hereby incorporated by reference and relied upon.) In this manner there are formed silica containing vulcanisates which produce even in high requirement articles such as tire tread surfaces performances equivalent to carbon black. A disadvantage of the mentioned compounds is the multistep production, thus the high industrial expense, which is also reflected in correspondingly high prices.

There is already known a cross-linkable rubber mixture which contains an oligosulphidic organosilane, known vulcanisation accelerator and as filler a silicate filler, but contains no elemental sulphur (Belgian Pat. No. 832,970 or German Pat. No. 2,356,674 or related Wolff U.S. patent application Ser. No. 34,203 filed Apr. 27, 1979. (The entire disclosure of the Wolff U.S. application is hereby incorporated by reference and relied upon.) The crosslinking carried out therewith can be designated simply as "sulphur free silane" crosslinking.

For mixtures based on SBR (styrene-butadiene rubber) and EPDM (ethylene-propylene-diene) rubbers there are also already known mercaptosilanes such as 3-mercaptopropyl trimethoxysilane, vinyl silane as well as vinyl trimethoxysilane and aminosilanes such as 3-aminopropyltriethoxysilane (Rubber World, October 1970, pages 54–54, the entire disclosure which is hereby incorporated by reference and relied upon).

There have also already been proposed silicate filler containing rubber mixtures based on the selected group of the halogen containing types of rubbers in which the mixtures inter alia contain specific halogen containing silanes producible in simple manner and easily available. It has been surprisingly shown that these mixtures give very valuable vulcanisation products.

SUMMARY OF THE INVENTION

It has been surprisingly found that the same, simple structured halogen containing silanes also favorably influence the vulcanisation process and the crosslinking kinetics in rubber mixtures based on those rubbers which contain no bound halogen in the molecule and allow the production of vulcanisates whose properties are particularly valuable and in part can be designed as outstanding as, e.g. the elasticity properties which e.g. are determined with the testing of the compression set.

According to the invention there is prepared a vulcanisable rubber mixture of a vulcanisable halogen free rubber or a mixture of halogen free rubber with a maximum of 80% based on the weight of the total rubber of a halogen containing rubber, additionally a silicate filler in an amount of 1 to 250 parts by weight, an oxide of the metal zinc, magnesium or lead in an amount of 0 to 15 parts by weight, a monobasic fatty acid having 12 to 24 carbon atoms in the alkyl chain, benzoic acid or salicylic acid in an amount of 0 to 10 parts by weight, optionally sulphur and/or sulphur donor in an amount of 0.1 to 15 parts by weight, a vulcanisation accelerator in an amount of 0.1 to 10 parts by weight, a plasticiser in an amount of 0 to 100 parts by weight, a stabiliser from the group of antiagers, fatigue inhibitors, antioxidants, light protective agents and ozone protective agents in an amount of 0 to 10 parts by weight of each, carbon black in an amount of 0 to 150 parts by weight, optionally additional customary rubber assistants in customary amounts and at least one organosilane in an amount of 0.1 to 20 parts by weight, the silane corresponding to the following formula

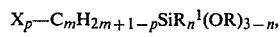

$$X_p-C_mH_{2m+1-p}SiR_n^1(OR)_{3-n}, \quad I$$

in which
X is chlorine or bromine
p is 1 or 2,
m is 1 to 5,
$R^1$ is a $C_1$- to $C_5$- alkyl group, a $C_5$- to $C_8$-cycloalkyl group or the phenyl group,
R is a $C_1$- to $C_5$- alkyl group, a $C_5$- to $C_8$-cycloalkyl group, the methoxyethyl group, the phenyl group or the benzyl group and
n is null, 1 or 2 or a hydrolysate and/or condensate of organosilane I, in which all stated amounts are based on 100 parts by weight of rubber.

The rubber mixture additionally can contain per 100 parts by weight of rubber 0.5 to 10 parts by weight of at least one organosilane of the formula

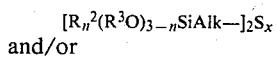

and/or

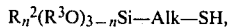

in which each $R^2$ and $R^3$ is an alkyl group with 1 to 4 carbon atoms, a cycloalkyl group with 5 to 8 carbon atoms, or the phenyl group, wherein all $R^2$ and $R^3$ groups can be the same or different, n is null, 1 or 2, Alk is a divalent straight or branched chain hydrocarbon group having 1 to 10 carbon atoms and x is a number from 2.0 to 8.0, a hydrolysate and/or a condensate of the organosilane I or II. Additionally there can be present a premix of at least one organosilane of formula I, II, or III and a silicate filler and/or carbon black.

When a premix of a silane, its hydrolysate and/or condensate and silica filler is used the composition can contain additionally 0.2 to 10 parts by weight per 100 parts by weight of silica filler at least one polyhydric alcohol. Examples of polyhydric alcohols are ethylene glycol, propylene glycol, diethylene glycol, a polyethylene glycol, e.g. triethylene glycol or tetraethylene glycol, glycerine, hexanetriol and/or glycidol.

The rubber mixture of the invention are useful for the production of vehicle tires, especially passenger car tires, truck tires and cross country vehicle tires, for production of tire treads of vehicle tires and for the production of industrial rubber goods and shoe soles.

For the haloalkyloxysilanes I, which according to the invention must be added in the diene rubber mixtures in amounts of 0.1 to 20 parts by weight, preferably 1 to 15 parts by weight based on 100 parts by weight of the rubber there are included in particular the following silanes: chloromethyl trimethoxysilane, chloromethyl triethoxysilane, bromomethyl triethoxysilane, dichloromethyl triethoxysilane, 1-chloro-1-methyl-ethyl trimethoxysilane, 2-chloroethyl trimethoxysilane, 2-bromoethyl trimethoxysilane, 2-dibromoethyl trimethoxysilane, 3-bromopropyl trimethoxysilane, 3-chloropropyl trimethoxysilane, 3-dichloropropyl trimethoxysilane, 3-chloropropyl triethoxysilane, 3-bromopropyl triethoxysilane, 3-dibromopropyl triethoxysilane, 2-bromo-1-methyl-ethyl tripropoxysilane, 2-dichloroethyl tri-n-butoxysilane, 2-chloroethyl tri-2-methyl propoxysilane, 3-bromopropyl tri-t-butoxysilane, 3-dibromopropyl triisopropoxysilane, 3-bromopropyl tri-n-pentoxysilane, 5-chloropentyl-trimethoxysilane, 2-bromoethyl triisopropoxysilane, 2-chloropentyl-trimethoxysilane, 2-chloro-n-butyl triethoxysilane, 2-chloroethyl tri-2'-ethylethoxysilane, 2-bromo-2-methyl-ethyl dimethoxyethoxy silane, 3-dichloropropyl-methoxy-ethoxy-propoxy silane, 3-chloropropyl dimethoxy methyl silane, 3-bromopropyl diethoxy ethyl silane, 3-chloropropyl ethoxy diethyl silane, 3-bromopropyl-tris-(1-methoxyethoxy)-silane, 3-chloropyl diethoxy phenyl silane, 3-dichloropropyl dimethoxycyclopentyl silane, 3-bromopropyl di-n-propoxy cyclohexyl silane, 3-chloropropyl dicyclohexoxy cyclohexyl silane, 3-bromopropyl diethoxy cycloheptyl silane, 3-chloropropyl ethoxyphenyloxyethyl silane, 3-dibromopropyl benzyloxyethoxyethyl silane, 4-chloro-n-butyl trimethoxysilane, 4-bromobutyl trimethoxysilane, 3-chloro-2-methyl propyl trimethoxysilane, 3-chloro-3-methyl propyl cyclo-octyl dipropoxysilane, 3-chloro-2-ethyl propyl diethoxymethylsilane, 3-bromo-3-ethyl-propyl dimethoxymethylsilane, 3-chloro-2-methyl propyl dimethoxyphenylsilane, 5-chloro-n-pentyl triethoxysilane, 4-bromo-1-methyl-butylcyclo-octoxy dimethoxysilane, 4-bromo-2-methyl-butyl triethoxysilane, 2-chloro-2-methyl-ethyl tripentoxysilane, 2-dichloro-2-methyl-ethyl tributyloxysilane, 3-bromopropyl triphenoxysilane, 3-chloropropyl tribenzyloxysilane, 3-dibromopropyl tricyclopentoxysilane, 3-bromopropyl tri-n-pentoxysilane, dibromoethyl triethoxysilane, dichloromethyl triethoxysilane, 2-dichloroethyl triethoxysilane, 2-dibromoethyl tri-n-propoxysilane, 3-dichloropropyl triethoxysilane, 2-dichloro-i-propyl triethoxysilane, 2-dibromo-i-propyl tri-i-propoxy silane, 3-dichloropropyl tri-n-propoxy silane, 3-dibromopropyl tri-n-butoxysilane, 4-dichlorobutyl triethoxysilane, 4-dibromobutyl tri-n-propoxysilane, 5-dichloropentyl triethoxysilane, 5-dibromopentyl tri-n-propoxysilane and mixtures of these halogen alkoxysilanes. It is preferred to use those halogen alkyloxysilanes which contain one halogen atom (p=1 in formula I) and three alkoxysilyl groups and mixtures thereof.

Among the silanes of Formula I with two halogen atoms there may be mentioned particularly dibromomethyltriethoxysilane, dichloromethyltriethoxysilane, 2-dichloroethyltriethoxysilane, 2-dibromomethyltri-n-propoxysilane, 3-dichloropropyltriethoxysilane, 2-dichloro-i-propyltriethoxysilane, 2-dibromo-i-propyl-tri-i-propoxysilane, 3-dichloropropyltri-n-propoxysilane, 3-dibromopropyltri-n-butoxysilane, 4-dichlorobutyltriethoxysilane, 4-dibromobutyltri-n-propoxysilane, 5-dichloropentyltriethoxysilane, 5-dibromopentyltri-n-propoxy silane and mixtures thereof.

In place of the silanes of Formulae I, II and III there can also be used their hydrolysates and condensates, in a given case partially, wherewith are meant mixtures of the non-hydrolyzed or non-condensed silanes with the hydrolysed and/or condensed silanes. This hydrolysis or condensation need not be complete so that partial hydrolysates or partial condensates can also be employed according to the invention. These partial hydrolysates or partial condensates are possible because the silanes have several oxysilyl groups in the molecule (see Formula II) or can have them (see Formulae I and III).

For the condensates there are particularly mentioned the condensates of the silane with alcohols, preferably dihydric alcohols such as glycols, e.g. ethylene glycol, propylene glycol, trimethylene glycol, trimethyl ethylene glycol, tetramethylene glycol, pentamethylene glycol, etc., diethylene glycol, butanediols such as 1,4-butanediol, dipropylene glycol, polyethylene glycols and glycidol (2,3-epoxypropanol-1).

The hydrolysis as well as the condensation reactions are carried out according to known processes. They lead to higher molecular weight compounds with e.g. higher boiling points, etc. which can be of advantage for the production of the rubber mixtures of the invention.

The silanes corresponding to formula I can be obtained by method known per se, for example from halogen silanes still containing at least one hydrogen atom, by catalytically controlled addition with a halogenated hydrocarbon containing a C-C-double bond (hydrosilylation). The halogen atom(s) situated on the silicon atom are then converted into alkoxy silanes again in known manner, for example, by alcoholysis. It has been found that the crude silanes emanating from production may be directly used with success for the purposes of the invention providing they are substantially free from hydrolysable halide and hydrogen halide. If present, these impurities are removed by treatment with ammonia or sodium hydride, optionally followed by rectification.

The types of rubber which can be employed according to the invention include all rubbers and their mixtures still containing C-C double bonds and crosslinkable with sulphur as well as vulcanisation accelerators to elastomers which do not contain halogen in the molecule; particularly so-called diene elastomers. Included for example are natural and synthetic rubbers, which can be oil extended, such as butadiene rubber, isoprene rubber, butadiene-styrene rubber, butadiene-acrylonitrile rubber, butyl rubber, terpolymers from ethylene, propylene and non-conjugated dienes, e.g. cyclooctadiene or norbornadiene, carboxyl rubbers, epoxide rubbers and trans-polypentenamers. Rubber blends of the above mentioned types of rubbers with other polymers in an amount in general of a maximum of 80 weight percent, preferably less than 50% based on the weight of the total rubber, are likewise usable according to the invention. For examples these include halogenated butyl rubber, particularly brominated or chlorinated butyl rubber, chlororubber, rubber hydrochloride and especially the polymers of 2-chlorobutadiene-1,3, additionally chlorosulphonated polyethylene, ethylene-propylene copolymers, ethylene-vinyl acetate copolymers, chemical derivatives of natural rubber and modified natural rubber. Preferred are diene rubbers as well as EPDM polymers and their blends.

The silicate fillers usable according to the invention, as well as mixtures of two or more fillers are of themselves known fillers in the rubber technology. Therefore, the term "silicate filler" is broad and refers to rubber compatible fillers or fillers workable into rubber mixtures which consist of silicates, contain silicates and/or contain chemically bonded silicates in the broadest sense.

Especially counted as siliceous fillers are:

Highly dispersed silica (silicon dioxide) having a specific surface area in the range of about 5 to 1000, preferably 20 to 400 m$^2$/g (determined with gaseous nitrogen according to German Industrial Standard DIN 66132) and with primary particle sizes in the range of about 10 to 400 nm (nanometer, $10^{-9}$ meters), which can be produced, for example, by precipitation from solutions of silicates, by hydrolysis and/or oxidative high temperature conversion. There can also be used fillers produced by flame hydrolysis of volatile silicon halides, e.g., silicon tetrachloride, pyrogenic silica or by an electric arc process. These silicas, in a given case, can also be present as mixed oxides or oxide mixtures with oxides of the metals aluminum (alumina), magnesium (magnesium oxide), calcium (calcium oxide), barium (barium oxide), zinc (zinc oxide), or titanium (e.g. titanium dioxide).

Synthetic silicates, for example, aluminum silicate or alkaline earth silicates such as magnesium, or calcium silicate with specific surface areas of about 20 to 400 m$^2$/g and primary particles sizes of about 10 to 400 nm.

Natural silicates, for example, kaolin, wollastonite, talc and asbestos as well as natural silicas, e.g., quartz and kieselguhr.

Glass fibers and glass fiber products such as mats, webs, strands, fabrics, non-woven fabrics and the like as well as microglass balls (microglass balloons).

The siliceous fillers mentioned can be added preferably in amounts of about 10 or, in a given case, even less, up to about 250 parts by weight based on 100 parts by weight of rubber polymer.

As filler mixtures there can be used, for example, silica-kaolin or silica-glass fibers-asbestos, as well as blends of siliceous reinforcing fillers with the mentioned rubber blacks, for example, silica-HAF carbon black or silica-glass fiber cords ISAF carbon black.

Typical examples of siliceous fillers usable in the invention, for example, are those produced by Degussa, such as silica or silicate under the tradenames Aerosil, Ultrasil, Silteg, Durosil, Extrusil, Calsil, and the hydrophobised silica fillers Aerosil R972 and Sipernat D17. Preferred as siliceous fillers are the named highly dispersed or active silicas, especially precipitated silicas, in an amount of 5 to 150 parts by weight based on 100 parts by weight of rubber.

Additionally carbon black can be present in the rubber compositions of the invention, not only for gray or black pigmentation of the vulcanisate, but for the production of especial valuable vulcanisation properties, wherein the known rubber blacks are present. Preferably the carbon black is present in an amount of 0 to 150 parts by weight based on 100 parts by weight of rubber in the new rubber mixture. When present the amount of carbon black is at least 0.05 per part 100 parts of rubber.

Such carbon blacks include the rubber blacks produced by Degussa, e.g. under the trademark Corax black.

In the case of the presence of siliceous fillers and carbon black in the rubber compositions the total amount of filler based on 100 parts by weight of rubber is limited to a maximum of 300 parts by weight, preferably up to 150 parts by weight.

A lower limit with the number zero in the present invention means that the component can be present in the rubber mixture but need not be. Thus, e.g. if carbon black is present in a mixture a lower practical limit is 0.05 parts by weight per 100 parts of rubber.

It has proven especially advantageous in practice to mix one or more halosilanes of formula I with the desired silicate filler and/or the carbon black before working into the constituents of the rubber mixture, for example mixing the halosilane of formula I with an HAF black of specification N 330 (specific surface area according to DIN 66132 is 78 m$^2$/g, average particle size 27 nm, dibutyl phthalate absorption according to DIN 5360 is 100 ml/100 g) or a silica filler (specific surface area between 160 and 190 m$^2$/g, average primary particles size 18 nm), consequently, to produce a premix of one or more of the silanes and fillers and this mixture to process further with the specified components of the mixture. Such premix are preferably the weight ratio mixtures 1:1 of halosilane and filler as e.g. a mixture of equal parts by weight of 3-chloropropyltriethoxysilane and precipitated silica or carbon black or silica filler and carbon black. Such silica fillers, particularly of high dispersed type with specific surface areas between 100 and 250 m$^2$/g are described above, likewise the carbon blacks. Particularly there are employed the types of carbon blacks which are processed in the rubber industry.

As accelerator or vulcanisation accelerators there are employed accelerators which are employed in the rubber processing industry and useful mostly for several types of rubber. However, in case halogen rubbers are co-used, also special vulcanisation accelerators are additionally employed. Among the vulcanisation accelerators which can be used there may be mentioned dithiocarbamate, xanthogenate and thiuram accelerators, as well as thiazole accelerators, including the mercapto and sulfenamide accelerators, amine accelerators or aldehyde-amine accelerators, basis accelerators, in which for example the guanidine accelerators and basic accelerators are included; see "Vulkanisation und Vulkanisationhilfsmittel" collected presentation of Dr. W. Hofmann, Leverkusen (Verlag Berliner Union, Stuttgent, 1965, pages 114 et seq., especially page 122), as well as—independent of the above classification—the general vulcanisation accelerator classes of the mercapto-, disulfide-, polysulfide-, sulfenamide-, thiazole- and thiourea accelerators. The thiuram accelerators essentially include the tetraalkyl or dialkyl diaryl thiuram mono-, di- and tetra- sulfides such as tetramethyl thirammonosulfide, tetramethyl thiuramidisulfide, tetramethylthiuramtetrasulfide, tetraethylthiuramdisulfide, dipentamethylene thiuram monosulfide, -disulfide, -tetrasulfide and -hexasulfide, dimethyl diphenyl thiuramdisulfide, diethyl diphenyl thiuramdisulfide, etc.

The dithiocarbamate accelerators are in general derivatives of the dialkyl, alkylcycloalkyl, and alkylaryl dithiocarbamic acids. Among the known members of this accelerator class are N-pentamethylene ammonium-$N^1$-pentamethylene dithiocarbamate and the zinc dialkyl dithiocarbamate, e.g., zinc diethyl dithiocarbamate, zinc dibutyl dithiocarbamate.

Xanthogenate accelerators are the known derivatives of alkyl and aryl xanthogenic acids as for example zinc ethyl xanthogenate, zinc n-butyl xanthogenate.

Among the mercapto accelerators there are included especially 2-mercapto-benzothiazole, 2-mercaptoimidazoline, mercaptothiazolines as well as the series of monomercapto and dimercaptotriazine derivatives (see for example British Pat. No. 1,095,219 and related Westlinning U.S. Pat. No. 3,366,598, the entire disclosures of which are hereby incorporated by reference and relied upon). Examples of mercapto-triazine accelerators are for example 2-diethanolamino-4,6-bis-mercapto-s-triazine and 2-ethylamino-4-diethyl-amino-6-mercapto-s-triazine.

Disulfide and sulfenamide accelerators are for example disclosed in British Pat. No. 1,201,862 and related Westlinning U.S. Pat. No. 3,801,537, the entire disclosures of which are hereby incorporated by reference and relied upon. Among such accelerators are 2-diethylamino-4,6-bis-(cyclohexyl-sulfenamido)-s-triazine, 2-di-n-propylamino-4,6-bis-(N-tert.butyl-sulfenamido)-s-triazine as well as N-cyclohexyl-2-benzothiazole sulfenamide. Among the disulfide accelerators there may be mentioned for example bis-(2-ethylamino-4-diethylamino-triazine-6-yl)-disulfide, bis-(2-methylamino-4-di-isopropylamino-triazin-6-yl)-disulfide as well as dibenzothiazyl disulfide.

Further sulfidic triazine accelerators are polysulfidic or oligosulfidic triazines or their polymers which can be produced according to German Offenlegungsschrift No. 2,027,635 and also are disclosed in British Pat. No. 1,353,532 and Wolff U.S. Pat. No. 3,755,366. The entire disclosures of these three patents are hereby incorporated by reference and relied upon. An example of such a triazine is poly-(2-diethylamino-bis-4,6-dithiotriazine).

Among the aldehydeamine accelerators are included saturated and unsaturated aliphatic aldehyde reaction products with ammonia, aliphatic or aromatic amines, as for example butyraldehyde-aniline and butyraldehyde-butylamine. Other basic accelerators are for example guanidine derivatives such as diphenyl guanidine and di-o-tolyl guanidine as well as amine accelerators such as hexamethylenetetramine, etc. Among the thiourea accelerators there are included for example thiourea itself and the diaryl thioureas such as 1,3-diphenyl-2-thiourea.

There can also be advantageous according to the invention in employing mixtures of two, three or more different accelerators as for example di-2-benzothiazyl disulphide with thiuram accelerators such as tetramethylthiuram-disulfide together with sulphur, which can be entirely or partially insoluble sulphur or with sulphur donors such as morpholine disulphide.

The accelerator can be used according to the invention in customary amounts, preferably in amounts of 0.2 to 10 parts by weight, based on 100 parts of the rubber.

There can be added with advantage to the rubber mixtures of the invention known stabilising agents, particularly those of the group of antiagers, fatigue inhibitors, antioxidants, light protective agents and ozone protective agents as well as mixtures of these materials, namely each in amounts of 0.2 to 10 parts by weight, based on 100 parts by weight of the rubber.

Furthermore, there can be added to the rubber mixtures plasticizers or plasticizer oils, for example highly aromatic naphthenic or paraffinic plasticizer oils, advantageously those having a low cold setting point between about 0° and $-60°$ C. The proportions of plasticizer oil can be within wide limits, thus it can be more than 0.5 or 5 parts by weight, especially more than 10 to about 100 parts by weight in each case based on 100 parts by weight of rubber.

The new rubber mixtures preferably contain an organic acid solid at room temperature as is used in the rubber technology in amounts of 0.2 to 10 parts by weight based on 100 parts by weight of the rubber, preferably fatty acids such as stearic acid, palmitic acid or corresponding acids of the homologous series of 12 to 24 carbon atoms in the molecule, e.g. lauric acid, lignoceric acid and behenic acid. Furthermore, there can be used benzoic acid or salicylic acid.

Furthermore, there can be added to the rubber mixtures of the invention oxides of polyvalent metals, as likewise are used in the rubber technology, in amounts of 0.1 to 15 parts by weight based on 100 parts by weight of rubber.

Of primary importance of the metal oxides is zinc oxide, particularly in finely divided and/or active form. Furthermore, there are usable magnesium oxide or in a given case lead oxide. These oxides advantageously are added in finely divided, active or powdery form. Mixtures of the metal oxides also can be employed, particularly in desired co-use of e.g. polychlorobutadiene whereby the named metal oxides act as crosslinking agents for this elastomer.

The oligosulfidic organosilane of the formula

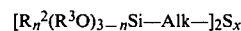

$$[R_n^2(R^3O)_{3-n}Si\text{—}Alk\text{—}]_2S_x \qquad \qquad II$$

in which $R^2$ and $R^3$ each is an alkyl group having 1 to 4 carbon atoms, a cycloalkyl group with 5 to 8 carbon atoms, the methoxyethyl group or the phenyl group, wherein each $R^2$ and $R^3$ can be the same or different, n is 0, 1 or 2, Alk is a divalent straight or branched chain hydrocarbon group having 1 to 10 carbon atoms and x is a number between 2.0 and 8.0, preferably up to 6.0, can be contained in the mixtures of the invention in amounts of 0.5 to 10 parts by weight per 100 parts by weight of rubber and can be made according to known processes (see for example Pletka U.S. Pat. No. 4,072,701, German Pat. No. 2,542,534 and Thurn Pat. No. 3,873,489, the entire disclosures of these two U.S. patents are hereby incorporated by reference and relied upon).

Examples of organosilanes within formula II and preferably enployed in the invention are bis(trialkoxysilylalkyl-)-oligo sulfides such as bis(2-trimethoxy-, triethoxy-, -(tri-(methoxy-ethoxy)-, -(tripropoxy-, -(tributoxy, (tri-i-propxy- and (tri-i-butoxy silyl-methyl)-oligo sulfides, namely the di-, tri-, tetra-, penta-, hexa-, hepta- and octasulfides, further the bis-(3-trimethoxy-, -triethoxy-, tri-methoxyethoxy-, tri-n-propoxy-, tri-i-propoxy-, tri-n-butoxy- and tri-i-butoxy silylpropyl)-oligo sulfide, namely again the di-, tri-, tetra-, penta-, hexa-, hepta- and octasulfide; furthermore the corresponding bis[3-trialkoxy-silylisobutyl]-poysulfides, the corresponding bis[4-trialkoxysilyl-butyl]-polysulfides and so forth up to bis[10-trialkoxysilyl-decyl]-polysulfides. Of those chosen, there are preferred relatively simply constructed organosilanes of formula II including bis-[3-trimethoxy-, triethoxy-, and tripropoxysilylpropyl]-polysulfides namely the di-, tri-, and tetra- sulfides especially the triethoxy compounds with 2, 3 or 4 sulfur atoms and their mixtures. Preferably these oligosulfidic silanes are used in an amount of 1 to 15 parts per 100 parts of siliceous filler in the new rubber compositions.

Specific examples of compounds within formula II include 3,3'-bis (trimethoxysilylpropyl) disulfide, 3,3'-bis (triethoxy silylpropyl) tetrasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trioctoxysilylpropyl) tetrasulfide, 3,3'-bis(trihexoxysilylpropyl) disulfide, 3,3'-bis(tri-2''-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilyl-ethyl) pentasulfide, 3,3'-bis(tricyclohexoxysilylpropyl) tetrasulfide, 3,3'-bis (tricyclopentoxysilylpropyl) trisulfide, 2,2'-bis(tri-2''-methylcyclohexoxysilylethyl) tetrasulfide, bis(trimethoxysilylmethyl) tetrasulfide, 3-methoxy ethoxy propoxysilyl 3'-diethoxybutoxysilylpropyltetrasulfide, 2,2'-bis(dimethylmethoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di-t-butylmethoxysilylpropyl) tetrasulfide, 2,2'-bis(-phenyl methyl methoxysilylethyl) trisulfide, 3,3'-bis(-diphenyl isopropoxysilylpropyl) tetrasulfide, 3,3'-bis(diphenylcyclohexoxysilylpropyl) disulfide, 2,2'-bis(-methyl dimethoxysilylethyl) trisulfide 2,2'-bis(methyl ethoxypropoxysilylethyl) tetrasulfide,3,3'-bis(diethyl methoxysilylpropyl) tetrasulfide, 3,3'-bis (ethyl di-sec. butoxysilylpropyl) disulfide, 3,3'-bis(butyldimethoxysilylpropyl) trisulfide, 3,3'-bis(phenyl dimethoxysilylpropyl tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 4,4'-bis(trimethoxysilylbuten-2-yl) tetrasulfide, 4,4'-bis(trimethoxysilyl-cyclohexylene) tetrasulfide, 5,5'-bis(dimethoxy methylsilylpentyl) trisulfide, 3,3'-bis (trimethoxy silyl-2-methylpropyl) tetrasulfide, 3,3'-bis (dimethoxyphenylsilyl-2-methylpropyl) disulfide.

In place of the mentioned oligosulfidic alkoxy or phenoxysilyl compounds there can be employed their completely or partially hydrolysed compounds or these can replace a portion of the non-hydrolysed compounds.

The following mercaptosilanes of formula III are preferably employed: mercaptomethyltrimethoxysilane, mercaptomethyltriethoxysilane, mercaptomethyltri-i-propoxysilane, 2-mercaptoethyltrimethoxysilane, 2-mercaptoethyltriethoxysilane, 2-mercaptoethyltri-i-propoxysilane, 2-mercaptoethyltributoxysilane, 2-mercaptoethyltri-n-propoxysilane, 2-mercaptoethyldiethoxymethylsilane, 2-mercapto-2-methylethyl-triethoxysilane, 2-mercapto-1-methylethyltrimethoxysilane, 3-mercaptopropyltrimethoxysilane, 3-mercaptopropyltriethoxysilane, 3-mercaptopropyltri-i-propoxysilane, 3-mercaptopropyltri-n-propoxysilane, 3-mercaptopropyltri-n-butoxysilane, 3-mercaptopropyltris-(methoxyethoxy)-silane, 4-mercaptobutyltriethoxysilane, 5-mercaptopentyltrimethoxy-silane, 5-mercaptopentyltri-i-propoxysilane, 3-mercaptopropyldiethoxyethylsilane, 3-mercaptopropyldipropoxypropylsilane, 6-mercaptohexyltriethoxysilane, 8-mercaptooctyltrimethoxysilane and 1- mercaptodecyltriethoxysilane.

The rubber mixtures are produced in the customary manner. Preferred is a two step mixing cycle. In the first the following components are mixed in a kneading apparatus at flow through temperatures between 55° and 85° C., preferably 60° C.

Within the first minute the rubber as well as in the case of the additional presence of a halogen rubber also a metal oxide, e.g. magnesium oxide;

Within the next one and a half minutes, half of the silicate filler, zinc oxide, stearic acid and silane(s);

Within the next one and a half minutes the second half of the silicate filler as well as in a given case the plasticizer (e.g. plasticizer oil) and the remainder of the mixing components with the exception of the sulphur and the accelerators;

After in all four and one half minutes the mixture is driven out of the kneader and stored for 24 hours at room temperature.

In the second mixing step the sulphur and the accelerator is mixed into the premix from the first mixing step on a pair of rolls or in a kneader at a starting temperature of about 80° C. within 1½ minutes.

This two step mixing process avoids the premature prevulcanisation of the mixture.

The course of the vulcanisation can be represented on the basis of a vulcanisable curve. The vulcameter curve is formed by plotting with a vulcameter (see DIN 53529) torque on the abscissa of a rectangular coordinate system against the vulcanisation time as the ordinate. The commencing of the vulcanisation is shown in an increasing leg of the vulcameter curve. The curve then usually reaches a maximum or shows a maximum value and in the course of the further vulcanisation in most cases more or less rapidly or slowly falls. With constant temperature plotted vulcameter curves can also be designated as crosslinking isotherms.

In the customarily practiced vulcanisation of rubber mixtures in the industry based on natural or synthetic rubbers in the presence or absence of rubber fillers with the help of sulphur and vulcanisation accelerators the mentioned crosslinking isotherms customarily run through a maximum which arises from the complex chemical processes during vulcanisation in the beginning stage when the built up of polysulfidic crosslinking positions between the rubber molecules predominates, whereas in the final stage on the contrary the breakdown of intermolecular polysulfidic and disulfidic bridges to intramolecular heterocyclic rings takes place. This process is marked in a vulcametrically determined crosslinking isotherm through a continuous falling of the crosslinking isotherm, thus in a decrease of the torque and, in practice, in decreasing moduli with increasing vulcanisation time. From the course of the vulcanimetrically determined crosslinking isotherm there can be read off the change of the relative crosslinking density of the vulcanisate (height of the torque) as well as the relative crosslinking density present at this timepoint of the vulcanisation. Parallel to the change of the crosslinking densities there goes along a change of the mechanical properties of the vulcanisate, insofar as this property is dependent upon the crosslinking density such as the tear strength, elongation at break, elasticity, shore hardness, heat build up, abrasion, etc. The falling branch of the vulcameter curve in practice means a deterioration of the named properties of the vulcanisate. This phenomenon is spoken of in the art as "reversion".

The invention also includes the process of vulcanisation of the rubber mixtures and also be uses of the composition.

Industrial applications for the described rubber mixtures and their vulcanisates are, for example, industrial rubber articles such as cable sheaths, hoses, heating tubes, also electrical insulations, linings, impregnations and coatings of heat-resistant fabrics, particularly drive belts, V-belts, conveyor belts, roll coverings, seals, as well as shoe soles, damping and vibration elements and similar articles which have high requirements in regard to elasticity properties, as is especially demonstrated by testing of compression set (DIN 53517), and also have high requirements in regard to temperature and/or oil resistance.

The outstanding action of the halosilanes of the above mentioned general formula in halogen free rubber containing mixtures or moulding compositions and their cross-linked products or vulcanisates was very surprising.

Unless otherwise indicated all parts and percentages are by weight.

The composition can comprise, consist essentially of or consist of the stated materials and the process can comprise, consist essentially of or consist of the stated steps.

DETAILED DESCRIPTION

Without limiting the invention, in the following there are given several exemplary recipes for the new rubber mixtures of the vulcanisate or cross-linking product, with evaluation or comparison of these results. Therein there are repeated many different concepts so that the following abbreviations are used.

Definition of the Abbreviations Used

| Abbreviation | Designation | Measured In |
| --- | --- | --- |
| $t_5$ | Mooney-Scorch-time (130° C.) | Minutes |
| $t_{35}$ | Mooney-Cure-time (130° C.) | Minutes |
| ML 4 | Mooney-Plasticity or or Viscosity (determined at 100° C. with standard rotor (L); testing time 4 minutes | Mooney Units (torque) |
| MS 4 | Same with the small rotor (S) | Mooney Units |
| ZF | Tensile strength | kp/cm$^2$ |
| M 200 | Modulus at 200% and | kp/cm$^2$ |
| M 300 | modulus at 300% elongation | kp/cm$^2$ |
| WW | Tear propagation resistance (at room temperature) | kp/cm$^2$ |
| BD | Elongation at break | % |
| SH | Shore-A-Hardners | — |
| A | Abrasion (also DIN-abrasion) | mm$^3$ |
| CS | (Compression Set B, 22 hours, 70° C.) | % |
| $D_{min}$ | Minimal torque (Rheometer testing) | mkp |
| $D_{max}$ | maximal testing torque | mkp |
| $D_{120'}$ | Torque afer 120 minutes testing in the Rheometer | mkp |
| $D_{60'}$ | The same afer 60 Minutes testing | mkp |
| t 10% | Reaction time until a 10% yield | Minutes |
| t 80% | Reaction time up to 80% reaction rate and | Minutes |
| t 95% | up to 95% yield of the vulcanisation reaction in relation to the maximal yield (same Vulcametercurve) | Minutes |

Testing Standards

The physical tests were carried out at room temperature according to the following standard specification:

| (DIN = German Industrial Standards) | |
| --- | --- |
| Tensile strength, elongation at break and modulus on 6mm large rings | DIN 53504 |
| Tear Propagation resistance | DIN 53507 |
| Shore A hardness | DIN 53505 |
| Specific gravity | DIN 53550 |
| Mooney Test | DIN 53523 & DIN 53524 or ASTM D927-57T |
| Abrasion (also called DIN-abrasion) | DIN 53516 |
| Determination of the compression set of the rubber | DIN 53517 ASTM D395 |
| Rheometer test/vulcameter | (DIN 53529 (Tentative Standard Oct.1972) |

The vulcanisates or test sample were always produced in a steam heated multiple die press at the stated vulcanisation temperatures. The heating times (vulcanisation times) are in each case the optimal heating times ascertained from the rheometer curves. In the examples the amounts of the constituents in the composition are given in parts by weight (GT).

The comparison mixtures at times placed first are designated with the letter V before the number. The corresponding mixtures of the invention are designated with the letter E placed in front thereof.

The production of the mixtures takes place in each case in two phases separated timewise in a conventional kneader which in each case is heated to a starting temperature of 80° C. and whose rotor is regulated to 40 revolutions per minute (rpm). The friction was 1:1.16.

In a first mixing phase the entire amount of rubber was first added within one minute, after that the first half of the filler, the zinc oxide, the stearic acid and the silane within around 1½ minutes. After that the second half of the filler was likewise added during a mixing time of 1½ minutes. The following general cleaning of the kneader parts as, e.g. the post, lasted one-half minute and after a total mixing time of 5 minutes the premix formed was removed from the kneader.

Then the premix was stored for 24 hours at room temperatures. Subsequently the second mixing phase was carried out with the same kneader, the same speed of rotation, friction and starting temperature, during which within 1½ minutes there were added the premix, the sulphur and/or the accelerator and all constituents where processed to a mixture having uniform distribution of the constituents of the mixture.

As the results of the measurements on the rubber mixtures and the vulcanisates it can be seen that overall the described method of mixing is most favorable. Thereby the zinc oxide and stearic acid are added suitably at the beginning of the mixing.

The mixtures thus formed are designated in the following Example 1 with V1.1 (Comparison mixture of Example 1 No. 1), E1.1.1(mixture according to the invention, Example 1 No. 1.1) and E1.2.1 (mixture according to the invention of Example 1 No. 2.1).

On the contrary if the zinc oxide or analogous metal oxide and the stearic acid or analogous organic acids, especially analogous fatty acids, are added and worked in later in the course of the mixing process, according to the following example in the second phase, then there is clearly visible a difference in properties of the mixtures and vulcanisates, thus e.g. in the Mooney viscosities or plasticities, however, even in the properties of the vulcanisates. There were also measured the Mooney viscosities MS 4 of corresponding, alternative mixtures. These are the comparison mixtures V1.2 and the mixtures according to the invention E1.1.2 and E1.2.2.

The determination of the plasticity according to Mooney (MS 4-value) is carried out according to DIN 53523 with the small rotor at 100° C. testing temperature (see following Table I).

DETAILED DESCRIPTION OF THE INVENTION

Examples (1) There were produced three rubber mixtures from the following mixing constituents

| Mixtures and | V 1.1 E<br>V 1.2. E | 1.1.1 E<br>1.1.2 E | 1.2.1<br>1.2.2 |
|---|---|---|---|
| Styrene-Butadiene-rubber (SBR 1500) | 100 | 100 | 100 |
| granulated, active precipitated silica filler[1] (Ultrasil ® VN 3 of Degussa) | 50 | 50 | 50 |
| Zinx oxide, finely divided, active | 4 | 4 | 4 |
| Stearic Acid | 2 | 2 | 2 |
| Chloropropyltriethoxysilane | — | 3 | 7.5 |
| N-Cyclohexyl-2-benzo-thiazolsulfenamide | 1 | 1 | 1 |
| Sulphur | 2 | 2 | 2 |

[1]Average primary particle size of this filler 18μ and specific area (DIN 66132) 175 m²/g.

The mixtures thus formed are designated V1.1 (comparison mixture of Example No. 1), E1.1.1 (mixture of Example No. 1.1 according to the invention) and E 1.2.1 (mixture of Example 1 No. 2.1 according to the invention).

TABLE 1

| Mixture | V 1.1 | E 1.1.1 | E 1.2.1 | V 1.2 | E 1.1.2 | E 1.2.2 |
|---|---|---|---|---|---|---|
| MS 4 | 82 | 78 | 70 | 140 | 108 | 76 |
| $D_{min}$ | 0.121 | 0.116 | 0.098 | 0.275 | 0.141 | 0.110 |
| $D_{120'}$ | 0.757 | 0.840 | 1.083 | 0.977 | 0.897 | 1.091 |
| $D_{120'} - D_{min}$ | 0.636 | 0.724 | 0.985 | 0.702 | 0.755 | 0.981 |
| t 10% | 11.7 | 14.7 | 12.0 | 17.2 | 16.1 | 17.2 |
| t 90% | 60.4 | 80.5 | 64.4 | 84.4 | 76.3 | 62.6 |
| t 95% | 71.0 | 93.1 | 86.1 | 95.0 | 89.4 | 74.8 |
| t 90 − t 10% | 48.7 | 65.8 | 52.4 | 67.2 | 60.1 | 45.4 |
| $\dfrac{D_{120'} - D_{60'}}{D_{120'} - D_{min}} =$ | 9.4 | 20.2 | 11.2 | 25.4 | 17.7 | 9.8 |
| ZF | 14.0 | 21.6 | 20.0 | 12.9 | 17.3 | 16.5 |
| M 300 | 3.0 | 4.3 | 8.9 | 3.0 | 4.1 | 8.4 |
| BD | 710 | 700 | 470 | 720 | 660 | 440 |
| E | 34 | 35 | 37 | 37 | 34 | 36 |
| SH | 59 | 61 | 68 | 61 | 59 | 66 |
| A | 170 | 124 | 91 | 169 | 125 | 87 |

In Table 1 and also in the following text the D value signifies the torque in meter kiloponds (mkp) determined with the help of a Vulcameter or rheometer. The torque was taken from vulcametrically measured crosslinking isotherms. As vulcameter there was employed an apparatus of Monsanto Europe S.A. B-1150 Brussels of the type Rheometer MPV. In the rheometer testing the following conditions were maintained: Deformation amplitude 3°, testing frequency 3 cycles per minute, testing temperature 160° C. and running time 2 hours. In regard to the concept vulcametry and crosslinking isotherm reference is made to the tentative standard DIN 53529 of February, 1971, particularly sheet 1 of this preliminary standard.

The figures in Table 1 show that the silane causes a clear reduction of the viscosities of the rubber mixtures according to the invention, which is equated with a reduction of the operating expense. The reduction in viscosity is even clearer or more advantageous if the silane portion in the mixtures, as shown, is increased. The viscosity can correspondingly still further be reduced as shown and vice versa.

(2) In a basic mixture of

| Consituent | Parts by Weight |
|---|---|
| Natural rubber (SMR 5; ML 4 = 67) | 100 |
| Silica filler (as in Example 1) | 50 |

| Consituent | Parts by Weight |
| --- | --- |
| Zinc oxide | 4 |
| Stearic acid | 2 |
| Silane various | as given below |
| N-Cyclohexyl-2-benzo-thiazolsulfenamide | 1.5 |
| Sulphur | 2 | there were in each case worked up silanes in type and amount as shown. A comparison mixture contained no silane, a further mixture contained 6 GT of industrial silane Si 69, substantially consisting of bis-(3-triethoxysilylpropyl)-oligosulphide with a sulphur content of 22.0 weight percent according to the state of the art. Two mixtures according to the invention contain 6 GT of 3-chloropropyltriethoxy silane (abbreviated Cl-PTES) and 6 GT Cl-PTES.

There were produced as described above the four mixtures. The rolled sheet formed was partially shaped to plates of 20×10 cm size and 6 mm thickness and these were vulcanised at 150° C. Another portion of the four mixtures was taken for the rheometer testing at 150° C. There resulted, among others the following values:

TABLE II

| | Without Silane | With Si 69 6 pts. by Wt. | With Cl-PTES | |
| --- | --- | --- | --- | --- |
| | | | 6 pts. by Wt. | 8 pts. by Wt. |
| $D_{min}$ | 3.36 | 0.77 | 0.65 | 0.58 |
| ML 4 | 161 | 75 | 72 | 66 |
| $t_{10\%}$ | 20 | 15.3 | 29.4 | 31 |
| $t_{80} - t_{20\%}$ | 120 | 6.4 | 6.1 | 4.2 |
| WW | 7 | 39 | 42 | 47 |
| SH | 62 | 63 | 57 | 58 |
| CS (22 hours; 70° C., unaged) | 32.7 | 17.7 | 16.9 | 17.8 |

(3) In the same basic mixtures as in Example 2 with the exception that there was used 100 parts by weight of polyisoprene rubber (Natsyn 2200 of Goodyear Tire Rubber Co., Chem. Div., Akron 16, Ohio, USA) in place of natural rubber there were again worked in the same silane according to the state of the art (Si 69) and according to the invention Cl-PTES, in the same amounts and for comparison there was also co-tested a mixture without the addition of silane. The following values were found (Testing carried out as in Example 2).

TABLE III

| | Without Silane | With Si 69 6 pts. by Wt. | With Cl-PTES | |
| --- | --- | --- | --- | --- |
| | | | 6 Pts. by Wt. | 8 Pts. by Wt. |
| $D_{min.}$ | 4.18 | 1.30 | 1.00 | 0.85 |
| ML 4 | 136 | 87 | 77 | 71 |
| $t_{10\%}$ | 8.5 | 15.7 | 36 | 39 |
| $t_{80} - t_{20\%}$ | 15.1 | 5.4 | 6.3 | 4.6 |
| WW | 9 | 33 | 33 | 39 |
| CS (22 hours; 70° C. unaged) | 28.2 | 14.5 | 12.8 | 12.8 |

From this there can be gathered particularly clear improvements in the viscosities of the mixtures and in the values for the resistance to tear propagation and the Compression Set.

(4) Rubber mixtures were produced from the following components and tested analogously to the preceding examples.

| Components | Parts by Weight |
| --- | --- |
| Polybutadiene-rubber-having 98% cis-1-4-content | 70 |
| Natural Rubber (First Latex Crepe) | 30 |
| Silica filler (see Example 1) | 50 |
| Zinc oxide (red seal quality) | 4 |
| Stearic acid | 2 |
| Naphthenic plasticizer oil (setting point - 28° C.) | 12 |
| Antiager, a mixture of aralkylated Phenols (D = 1.06 g/ml; B.P. 0.4 = 130° C.) | 1 |
| Silane, various | As stated below |
| Accelerator zinc ethylphenyl dithiocarbamate | 0.5 |
| Benzothiazol-2-dicyclohexylsulfenamide | 1 |
| Sulphur | 1.67 |

A comparison mixture was produced without addition of silane and a further comparison mixture contained 3.3 parts by weight of silane Si 69 (see Example 2). The mixture according to the invention contained 6 and 8 parts by weight of the silane Cl-PTES (see Example 2).

TABLE IV

| | Without Silane | With Si 69 3.3 Pts. by Wt. | With Cl-PTES | |
| --- | --- | --- | --- | --- |
| | | | 2 Pts. by Wt. | 4 Pts. by Wt. |
| $D_{min.}$ | 3.18 | 1.32 | 1.79 | 1.14 |
| ML 4 | 148 | 51 | 62 | 58 |
| $t_{10\%}$ | | 8.8 | 12.8 | 13.4 |
| $t_{80} - t_{20\%}$ | 120 | 3.4 | 5.4 | 3.1 |
| WW | 23 | 17 | 18 | 26 |
| SH | 62 | 58 | 47 | 50 |

(5) From the following mixture components and amounts there were produced as described above rubber mixtures and these were tested in a manner analogous to the preceding examples.

| Components | Parts by Weight |
| --- | --- |
| Styrene-Butadiene-rubber (SBR 1712) | 96.2 |
| cis-1,4-Polybutadiene rubber (see Example 4) | 30 |
| precipitated, active, granulated silica filler (average Primary particle size 28 μm, specific surface area (DIN 66132) 130 m²/g) | 30 |
| Rubber black N 339 | 40 |
| Zinc oxide (see Example 4) | 4 |
| Stearic acid | 2 |
| N-Isopropyl-N'-phenyl-p-phenylene diamine | 2 |
| Poly-2,2,4-trimethyl-1,2-dihydroquinoline | 1 |
| Ozone protective wax (parrafin base, solidification point 61–65° C., Type G 35) | 1 |
| Plasticizer oil, highly aromatic of setting point ± 0° C. | 20 |
| Polyethylene glycol (average molecular weight 4000) | 1 |
| Silane various | amounts as given below |
| Tetramethylthiurammonosulfide | 0.3 |
| N-tert.Butyl-2-benzothiazyl-sulfenamide | 1 |
| Sulphur | 2.2 |

A comparison mixture produced therefrom contained no silane, another mixture contained 3.6 parts by weight of the industrial silane Si 69 (see Example 2) and the two mixtures according to the invention contained 3.6 parts by weight or 4.8 parts by weight of Cl-PTES (see Example 2.)

TABLE V

|  | Without Silane | With Si 69 3.6 pts. by Wt. | With Cl-PTES | |
|---|---|---|---|---|
|  |  |  | 3.6 pts. by Wt | 4.8 pts. by Wt. |
| $D_{min}$. | 0.75 | 0.71 | 0.65 | 0.67 |
| ML 4 | 51 | 50 | 46 | 46 |
| $t_{10}\%$ | 11.5 | 9.8 | 12.3 | 12.0 |
| $t_{80} - t_{20}\%$ | 2.1 | 2.0 | 1.9 | 1.7 |
| WW | 20 | 18 | 24 | 24 |
| SH | 54 | 58 | 53 | 53 |
| CS (22 hours; 70° C., unaged) | 21.2 | 20.7 | 20.2 | 19.3 |

(6) Four mixtures were produced according to the above described process from the following mixture constituents and amounts based on butyl rubber and the mixtures were tested.

| Constituents | Amounts in Parts by Weight |
|---|---|
| Isoprene-Isobutylene rubber | 100 |
| Active, granular silica filler (see Example 1) | 50 |
| Zinc oxide (see Example 4) | 5 |
| Stearic acid | 1 |
| Naphthenic Plasticizer oil (see Example 4) | 5 |
| Polyethyleneglycol (see Example 5) | 3 |
| Silane, diverse | Amounts as shown below |
| Tetramethylthiuramdisulfide | 2 |
| Dipentamethylenethiuramtetrasulfide | 1 |
| Sulphur | 1.7 |

A comparison mixture was produced without silane, a second with 6 parts by weight of the silane Si 69 (see Example 2) and two mixtures according to the invention with 6 parts by weight, respectively 8 parts by weight, of silane Cl-PTES. The resulting test values were among others as follows:

TABLE VI

|  | Without Silane | With Si 69 6 Pts. by Wt. | With Cl-PTES | |
|---|---|---|---|---|
|  |  |  | 6 pts. by Wt. | 8 pts. by Wt. |
| $D_{min}$. | 2.16 | 0.72 | 0.75 | 0.64 |
| ML 4 | 112 | 67 | 68 | 62 |
| $t_{10}\%$ | 6.1 | 6.8 | 6.2 | 6.2 |
| $t_{80} - t_{30}\%$ | 17 | 11.7 | 6.0 | 7.6 |
| WW | 12 | 7 | 16 | — |
| SH | 64 | 69 | 61 | 62 |
| CS (22 hours, 70° C., unaged) | 34.1 | 29.2 | 27.8 | 27.2 |

(7) The following four mixtures based on butadieneacrylonitrile rubber were produced and tested analogously to the preceding examples.

| Components | Amounts |
|---|---|
| Butadiene-Acrylonitrile rubber having 34% Acrylonitrile content (Mooney Viscosity 45) | 100 |
| Active, granulated silica filler (see Example 5) | 50 |
| Zinx oxide (see Example 2) | 5 |
| Stearic acid | 1 |
| Dioctyl phthalate | 15 |

-continued

| Components | Amounts |
|---|---|
| Silane diverse | Amounts as given below |
| Tetramethylthiuramdisulfide | 2.5 |
| N-Cyclohexyl-2-benzothiazolsulfenamide | 1.5 |

The two comparison mixtures were again produced without addition of silane or with 6 parts by weight of silane according to the state of the art Si 69 and the two mixtures were produced according to the invention with 6 parts by weight or 8 parts by weight of silane Cl-PTES. Several selected representative test results are contained in the following table.

TABLE VII

|  | Without Silane | With Si 69 6 pts. by Wt. | With Cl—PTES | |
|---|---|---|---|---|
|  |  |  | 6 Pts. by Wt. | 8 Pts. by Wt. |
| $D_{min}$. | 1.32 | 0.68 | 0.74 | 0.53 |
| ML 4 | 84 | 56 | 59 | 51 |
| WW | 26 | 7 | 20 | 20 |
| SH | 61 | 55 | 53 | 68 |

(8) The following mixtures based on styrene-butadiene rubber were produced and tested in a manner analogous to the preceding examples.

| Components | Amounts |
|---|---|
| EPDM-rubber (Buna AP 541 of Buna-Werke Huls GmbH, 4370 Marl) | 100 |
| Active, granulated silica filler (see Example 5) | 50 |
| Zinc oxide (see Example 2) | 3 |
| Stearic acid | 1 |
| Plasticizer oils, parrafinic Manufacture: Sun Oil Cor. Texas U.S.A.) | 50 |
| 2,6-Di-tert.butyl-4-methylphenol | 1 |
| Silane, various | Amounts as given below |
| Di-2-benzothiazyldisulfide | 1.5 |
| Morpholindisulfide | 1.5 |
| Tetramethylthiuramdisulfide | 2.5 |

A comparison mixture was produced without silane additive, a further one with 6 parts by weight of the silane Si 69 and two mixtures according to the invention with 6 parts by weight 8 parts by weight of Cl-PTES (silane). Selected, representative test values are collected in the following table.

TABLE VIII

|  | Without Silane | With Si 69 6 pts. by Wt. | With Cl-PTES | |
|---|---|---|---|---|
|  |  |  | 6 Pts. by Wt. | 8 Pts. by Wt. |
| $D_{min}$. | 1.04 | 0.57 | 0.56 | 0.51 |
| ML 4 | 76 | 58 | 52 | 48 |
| $t_{10}\%$ | 4 | 4.9 | 5.1 | 5.2 |
| $t_{80} - t_{20}\%$ | 2.7 | 4.1 | 2.8 | 2.8 |
| ZF | 9.8 | 9.7 | 11.8 | 11.9 |
| WW | 11 | 6 | 8 | 8 |
| SH | 53 | 56 | 51 | 50 |
| CS (22 hours, 70° C., unaged) | 26.9 | 10.7 | 9.9 | 10.4 |

From the measured values it can be seen that there are improvements in the viscosities of the mixtures, tensile strengths, tear propagation resistance and Shore hardnesses with the silane of the invention.

(9) Four mixtures based on styrene-butadiene rubber were produced as described above from the following components and they were tested in accordance with the preceding examples.

| Components | Amounts |
|---|---|
| Styrene-butadiene rubber (SBR 1500) | 100 |
| Clay (Suprex clay of J.M. Huber Corp., Locust, N.J., U.S.A.) | 80 |
| Zinc oxide (see Example 2) | 4 |
| Stearic acid | 2 |
| Silane, various | amounts as given below |
| N-Cyclohexyl-2-benzothiazolsulfenamide | 1.5 |
| Sulphur | 2 |

There were produced a comparison mixture without silane additive, a second mixture with 3 parts by weight of the industrial silane Si 69 and two mixtures according to the invention with 4 parts by weight or 8 parts by weight of the silane Cl-PTES. The testing of the mixtures took place in a manner analogous to the preceding examples and gave the following values:

TABLE IX

| | Without Silane | With Si 69 3 pts. by Wt. | With Cl—PTES 4 pts. by Wt. | With Cl—PTES 8 pts. by Wt. |
|---|---|---|---|---|
| $D_{min.}$ | 0.88 | 0.94 | 0.79 | 0.77 |
| ML 4 | 75 | 79 | 69 | 67 |
| WW | 12 | 13 | 12 | 15 |

(10) Oil extended polybutadiene rubber is also accessible to the invention as is shown by the following mixtures from the mentioned components. The corresponding test results are set forth in Table X.

TABLE X

| Components | Amounts |
|---|---|
| Polybutadiene rubber oil extended with 37.5 parts by weight of highly aromatic oil per 100 parts by weight rubber | 137.5 |
| Active, granular silica filler (see Example 1) | 50 |
| Zinc oxide (see Example 2) | 4 |
| Stearic acid | 2 |
| Silane, various | amounts as given below |
| N-tert. Butyl-2-benzothiazolsulfenamide | 1.5 |
| Sulphur | 2 |

| | Without Silane | With Si 69 6 pts. by Wt. | With Cl-PTES 6 pts. by wt. | With Cl-PTES 8 pts. by Wt. |
|---|---|---|---|---|
| $D_{min.}$ | 2.48 | 1.14 | 1.16 | 1.01 |
| SH | 53 | 52 | 40 | 42 |

(11) The mixtures of the following constituents show that by inclusion of other silanes of the invention there are likewise produced valuable effects.

| Components | Amounts |
|---|---|
| Styrene-Butadiene-rubber (SBR 1500) | 100 |
| Active, granular silica filler (see Example 1) | 50 |
| Zinc oxide (ss Example 2) | 4 |
| Stearic acid | 2 |
| Silane, various | amounts as given below |
| N-Cyclohexyl-1-benzothiazolsulfenamide | 1.5 |
| Sulphur | 2 |

A comparison mixture was produced without silane additive. The mixtures of the invention contained in equimolar amounts four different silanes (see Table XI, among others Silanes A, B and C). The tests tooks place analogously to the preceding examples. Several representative results are collected in the following table.

TABLE XI

| | Without Silane | Cl-PTES 7.5 pt. by Wt. | Silane A 6.2 pt. by Wt. | Silane B 7.6 pt. by Wt. | Silane C 7.9 pt. by Wt. |
|---|---|---|---|---|---|
| $D_{120'} - D_{min}$ | 6.9 | 11.2 | 10.8 | 12.9 | 8.0 |
| ZF | 15.8 | 19.7 | 20.0 | 20.7 | 18.3 |
| M 300 | 3.4 | 8.8 | 8.9 | 15.3 | 4.6 |
| BD | 740 | 420 | 470 | 360 | 660 |
| SH | 62 | 67 | 69 | 73 | 64 |
| A | 172 | 103 | 97 | 75 | 163 |

Silane A = Chloropropyltrimethoxysilane
Silane B = Bromopropyltrimethoxysilane and
Silane C = Chlorobutyltriethoxysilane Particularly this example shows the surprising fact that by a concomitant use of haloalkyl alkoxy silanes the otherwise frequently needed additions of so-called secondary accelerators such as glycols and amino compounds are superfluous. Compared to the comparison mixture, a so-called zero mixture, there occurs a considerable increase in the tensile strength and the moduli 300 (stress value at 300% elongation). The Shore hardnesses and elongation at break follow the moduli values. Also the abrasion resistance was surprisingly improved, in some cases considerably.

Generally, the Cl-PTES causes a surprisingly strong lowering of the viscosities of the mixtures, as can be seen in the $D_{min}$ values (150° C.) as well as in the ML 4 and MS 4 values. This valuable effect is more or less marked depending on the type of rubber or rubber blend and better than it can be reached through addition of the silane according to the state of the art, the Si 69.

(12) The following mixtures based on styrenebutadiene rubber (SBR 1502) are mixtures used in practice for the production of transparent shoe soles.

| Component | Amounts |
|---|---|
| SBR 1502 | 100 |
| Zinc oxide (see Example 2) | 3 |
| Stearic acid | 1 |
| Mixed aralkylated Phenols (see Exmple 4) | 1 |
| Salicylic acid | 0.8 |
| Active, granular silica filler (see Example 1) | 50 |
| Silane | amounts as given below |
| Zinc-2-mercaptobenzothiazole | 1.75 |
| Diphenylguanidine | 1.75 |
| Hexamethylene-tetramine, granulated (containing 3 weight percent silica filler) | 1 |
| Sulphur | 2 |

A comparison mixture contained no silane additive. The mixtures of the invention contained 5 parts by weight or 7.5 parts by weight of Cl-PTES (see Example 2), and the silane additive was advantageously at once added after the rubber has been put into the mixer together with the first half of the silica filler. The temperature at the beginning of the first mixing phase was selected to be 80° C.; at the beginning of the second mixing phase (after 24 hours intermediate storage) it was 50° C. Otherwise the production and testing of the mixtures took place as described above (Rheometer tests at 150° C.).

TABLE XII

|  | Without Silane Additives | With Cl-PTES | |
|---|---|---|---|
|  |  | 5 pt. by Wt. | 7.5 Pt. by Wt. |
| $D_{min}$ | 1.26 | 1.21 | 1.14 |
| $D_{max}$ | 11.75 | 13.12 | 13.47 |
| $D_{max} - D_{min}$ | 10.49 | 11.91 | 12.33 |
| $t_{95\%}$ | 11.7 | 16.0 | 27.9 |
| $t_{90} - 5_{10\%}$ | 5.1 | 8.6 | 14.1 |
| $\dfrac{D_{max} - D_{(max+60')}}{D_{max} - D_{min}}$ (1) | 5.1 | 1.9 | 0.3 |
| ML 4 | 104 | 101 | 97 |
| t 5 | 3.1 | 2.8 | 1.6 |
| t 35 | 3.0 | 3.7 | 2.4 |
| ZF | 10.2 | 12.7 | — |
| M 300 | 4.4 | 6.5 | 7.7 |
| SH | 62 | 69 | 70 |
| A | 114 | 108 | 110 |

(1) The value of this fraction is named reversion and measured in percent

The resulting test values show as predominating results that the silane addition leads to lowering viscosities, to reducing velocity of vulcanisation and to lesser reversion. 0.3% indicates a practically reversion free mixture or a reversion free vulcanisates. For explanation there is added that the value $D_{(max+60')}$ is that torque which is measured at the time 60 minutes after appearance of the maximum torque. The vulcanisate clearly shows increase in the stress value (moduli) and in the Shore hardness and a slight reduction of the abrasion.

(13) The following mixtures contain a blend of two different types of rubbers, one halogen free and one a halogen containing rubber

| Components | Amounts |
|---|---|
| Styrene-Butadiene rubber (SBR 1500) | 60 |
| Polychlorobutadiene-rubber (chlorine content about 38%; viscosity 40 to 45 Mooney-units; Baypren 210 of Bayer A.G.) | 40 |
| Silica filler (see Example 1) | 50 |
| Magnesium oxide | 2 |
| Stearic acid | 2 |
| Silane | amounts as given below |
| Zinc oxide (see Example 1 and 4) | 5 |
| N-Cyclohexyl-2-benzothiazolsulfenamide | 1 |
| Sulphur | 2 |

As silanes the mixture according to the invention (E 13) contained 7.5 parts by weight of purified, distilled Cl-PTES. The comparison mixture (V 13) was a so-called zero mixture. The production and testing of the mixtures took place analogously to the preceding examples.

TABLE XIII

| Test | Mixture | |
|---|---|---|
|  | V 13 | E 13 |
| ML 4 (100° C.) | 155 | 121 |
| $D_{min}$ | 2.86 | 1.64 |
| ZF | 10.9 | 16.1 |
| M 200 | 3.7 | 5.6 |
| M 300 | 6.0 | 9.8 |
| A | 171 | 116 |
| CS (22 h; 70° C.; unaged) | 12.1 | 8.6 |

Through the addition of the chloropropyltriethoxysilane the Mooney viscosity was greatly lowered which means a better workability, with simultaneous improvement of the static properties of the vulcanisate: higher tensile strength, higher moduli, higher resistance to abrasion and lower (better) Compression set. The advantages of the mixture according to the invention with the comparably simply construced and produced chlorosilane and the vulcanisates therefrom are evident.

(14) The following mixtures based on styrene-butadiene rubber (SBR 1500) present proof of the advantageous addition of premixes of silanes and fillers with synergestic effects.

| Components | Mixture No. (amounts in parts by Weight) | | | | | |
|---|---|---|---|---|---|---|
|  | V 14.1 | E 14.1 | V 14.2 | E 14.2 | E 14.3 | E 14.4 |
| SBR 1500 | 100 | 100 | 100 | 100 | 100 | 100 |
| Zinc oxide (see Example 1) | 4 | 4 | 4 | 4 | 4 | 4 |
| Stearic acid | 2 | 2 | 2 | 2 | 2 | 4 |
| Silica filler (see Example 1) | 50 | 50 | 50 | 50 | 50 | 42,5 |
| HAF-Black N 330 | — | — | 7.5 | 7.5 | — | — |
| Cl—PTES, purified with ammonia | — | 7.5 | — | 7.5 | — | — |
| Pre-mixture carbon black/Cl—PTES(1) | — | — | — | — | 15 | — |
| Pre-mixture silica filler/Cl—PTES(2) | — | — | — | — | — | 15 |
| N-Cyclohexyl-2-benzothiazole sulfenamide | 1.5 | 1.5 | 1.5 | 1.5 | 1.5 | 1.5 |
| Sulphur | 2 | 2 | 2 | 2 | 2 | 2 |

(1) 1:1 mixture of HAF-black, powdered(BET-surface area 78 m²/g; average primary particle size 27 nm)and Cl—PTES.
(2) 1:1 mixture of silica filler (according to Example 1) and Cl—PTES The production and testing of the six mixtures of which four are according to the invention (E 14.1 to 14.4) took place in a manner analogous to the preceding examples. The relevant test results are collected in the following table (Vulcanisation temperature = 160° C.)

TABLE XIV

|  | V 14.1 | E 14.1 | V 14.2 | E 14.2 | E 14.3 | E 14.4 |
|---|---|---|---|---|---|---|
| Vulcanisation time | 85 | 80 | 80 | 80 | 80 | 80 |

TABLE XIV-continued

|  | V 14.1 | E 14.1 | V 14.2 | E 14.2 | E 14.3 | E 14.4 |
|---|---|---|---|---|---|---|
| ZF | 16.2 | 18.7 | 18.5 | 16.2 | 17.7 | 17.7 |
| M 200 | 2.5 | 5.9 | 3.5 | 5.1 | 6.1 | 7.0 |
| M 300 | 4.5 | 11.3 | 6.2 | 10.4 | 12.2 | 13.9 |
| BD | 620 | 390 | 550 | 340 | 370 | 340 |
| SH | 62 | 69 | 70 | 72 | 72 | 69 |
| A | 133 | 91 | 118 | 93 | 91 | 91 |
| Rheometer-test | | | | | | |
| $D_{min}$ | 1.90 | 1.36 | 2.37 | 1.42 | 1.52 | 1.58 |
| $D_{120'}$ | 8.49 | 12.53 | 10.07 | 13.47 | 13.88 | 12.38 |
| $D_{120'} - D_{min}$ | 6.58 | 11.18 | 7.70 | 12.05 | 12.36 | 10.80 |
| $\dfrac{D_{120'} - D_{60'}}{D_{120'} - D_{min}} =$ | 16.5 | 8.2 | 11.1 | 6.5 | 7.7 | 10.3 |
| Mooney-Test | | | | | | |
| ML 4 (100° C.) | 155 | 122 | 172 | 124 | 127 | 132 |
| $t_5$(130° C.) | >70 | 83.7 | 60.0 | 61.7 | 64.1 | 85.4 |

The values of the test results permit the following to be recognized. By addition of 7.5 parts by weight of the 3-chloropropyltriethoxysilane to the comparison or zero mixture V 14.1, the following improvements were produced. Increase of the tensile strength, great increase of the moduli as well as the Shore hardness and improvement of the abrasion (E 14.1). As to be expected there also occurred lesser improvements of the properties of the vulcanisate through the addition of carbon black and also the Rheometer values improved partially somewhat, whereas the Mooney viscosity, also according to expectation is made poorer (V 14.2, compared with V 14.1). If the silane is added (see 14.2 compared with V 14.2) there occurs again the desired partially very clear improvments, merely the tensile strength might be an exception.

However, if the pre-mixtures added in place of the separated individual additives then there occurs a surprisingly further improvements of the moduli and the crosslinking density, namely both in the black and also the white mixtures. This synergistic effect was confirmed after storing the pre-mix for two months, which indicates a good storability of the pre-mixes.

The entire disclosure of German priority application No. P 2933345.7-43 is hereby incorporated by reference.

The composition can comprise consist essentially of or consist of the stated materials.

Unless otherwise indicated all parts and percentages are by weight, the former at some instances abbreviated "GT".

While the premix of (1) the halosilane of formula I and (2) the silicate filler and/or carbon black preferably has a weight ratio of (1) to (2) of 1:1 this ratio can vary for example from 5 to 70% of the organosilane of formula I to 95 to 30% of the inorganic filler (silicate and/or carbon black). This is shown in more detail in companion Wolff et al U.S. application Ser. No. 178,159 filed Aug. 14, 1980 corresponding to German application P 2933346.8-43. The entire disclosure of the Wolff et al U.S. application is hereby incorporated by reference and relied upon.

What is claimed is:

1. A vulcanisable rubber mixture comprising (1) a vulcanisable halogen fgree rubber or a mixture of such a rubber with a halogen containing rubber in an amount up to 80% based on the total weight of the rubber, (2) a silicate filler in an amount of 1 to 250 parts by weight, (3) 0 to 15 parts by weight of an oxide of zinc, magnesium or lead, (4) 0 to 10 parts by weight of a fatty acid having 12 to 24 carbon atoms, benzoic acid or salicylic acid, (5) 0 to 15 parts by weight of sulphur or a sulphur donor or a mixture thereof, (6) 0.1 to 10 parts by weight of a vulcanisation accelerator, (7) 0 to 100 parts by weight of a plasticizer (8) 0 to 10 parts by weight of at least one member of the group consisting of an antiager, a fatigue protecting agent, an antioxidant, a light protective agent and an ozone protective agent, (9) 0 to 150 parts by weight of carbon black and (10) 0.1 to 20 parts by weight of silane corresponding to the following formula $$X_p-C_mH_{2m+1-p}SiR_n^1(OR)_{3-n},\qquad I$$

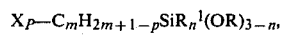

in which
X is chlorine or bromine
p is 1 or 2,
m is 1 to 5,
$R^1$ is a $C_1$- to $C_5$-alkyl group, a $C_5$- to $C_8$-cycloalkyl group or the phenyl group,
R is a $C_1$- to $C_5$-alkyl group, a $C_5$- to $C_8$-cycloalkyl group, the methoxyethyl group, the phenyl group or the benzyl group and n is 0, 1 or 2,
or a hydrolysate or condensate of the organosilane of formula I, all of the amounts being based on 100 parts by weight of the rubber.

2. A rubber mixture according to claim 1 wherein sulphur or a sulphur donor is present and is present in an amount of 0.1 to 15 parts by weight.

3. A rubber mixture according to claim 1 including 0.1 to 15 parts by weight of the oxide of zinc, magnesium or lead and 0.2 to 10 parts by weight of the fatty acid, benzoic acid or salicylic acid.

4. A rubber mixture according to claim 3 including 0.5 to 100 parts by weight of the plasticizer.

5. A rubber mixture according to claim 4 containing a fatty acid having 12 to 24 carbon atoms.

6. A rubber mixture according to claim 3 containing sulphur or a sulphur donor and also a fatty acid having 12 to 24 carbon atoms.

7. A rubber mixture according to claim 3 containing a sulphur donor.

8. A rubber mixture according to claim 1 including per 100 parts by weight of rubber, 0.5 to 10 parts by weight of an organosilane of the formula $$[R_n^2(R^3O)_{3-n}SiAlk-]_2S_x \qquad II$$

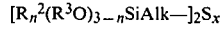

or $$R_n^2(R^3O)_{3-n}Si-Alk-SH \qquad III$$

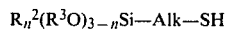

where $R^2$ and $R^3$ are each an alkyl group with 1 to 4 carbon atoms, a cycloalkyl group with 5 to 8 carbon atoms or the phenyl group, n is 0, 1 or 2, Alk is a divalent aliphatic hydrocarbon group having 1 to 10 carbon atoms and x is a number from 2.0 to 8.0, or a hydrolysate or condensate of an organosilane of formula II or III.

9. A rubber mixture according to claim 8 wherein the mixture includes a premix of (a) an organosilane of formula I, a hydrolysate or condensate thereof and (b) a silicate filler, carbon black or a mixture of a silicate filler and carbon black.

10. A rubber mixture according to claim 1 wherein the mixture includes a premix of (a) an organosilane of formula I, a hydrolysate or condensate thereof and (b) a silicate filler, carbon black or a mixture of a silicate filler and carbon black.

11. A rubber mixture according to claim 10 wherein the premix contains on a basis of 100% of (a) plus (b) 5 to 70% (a) and 95 to 30% (b).

12. A rubber mixture according to claim 11 wherein the premix contains (a) and (b) in a weight ration of about 1:1.

13. A rubber mixture according to claim 10 wherein the premix is free from carbon black.

14. A rubber mixture according to claim 10 wherein the premix contains carbon black.

15. A rubber mixture according to claim 10 wherein the organosilane is 3-chloropropyltriethoxysilane, a hydrolysate thereof or a condensate thereof.

16. A rubber mixture according to claim 1 wherein the organosilane is 3-chloropropyltriethoxysilane, a hydrolysate thereof or a condensate thereof.

17. A rubber mixture according to claim 16 wherein the organosilane is 3-chloropropyltriethoxysilane.

18. A rubber mixture according to claim 15 wherein the premix contains as at least a part of component (b) a silica filler obtained by precipitation in aqueous medium and having a specific surface of area between about 100 and 250 m$^2$/g.

19. A rubber mixture according to claim 18 wherein the premix is free from carbon black.

20. A rubber mixture according to claim 18 containing carbon black.

21. A rubber mixture according to claim 8 wherein the mixture includes a premix comprising (a) an organosilane of formula II and III or a hydrolysate or condensate thereof and (b) a silica obtained by precipitation in aqueous medium, a carbon black or a mixture of said silica and carbon black.

22. A rubber mixture according to claim 21 wherein the premix includes a bis-(3-triethoxysilylpropyl)-oligosulfide having 2 to 8 sulphur atoms.

23. A rubber mixture according to claim 22 wherein the premix contains said silica and the silica has a surface area of about 100 to 250 m$^2$/g.

24. A rubber mixture according to claim 21 wherein the premix contains 0.2 to 10 parts by weight per 100 parts by weight of silica of a polyhydric alcohol or an epoxyalcohol.

25. A rubber mixture according to claim 24 wherein the polyhydric alcohol comprises ethylene glycol, propylene glycol, diethylene glycol, a polyethylene glycol, glycerine, hexanetriol or glycidol.

26. A rubber mixture according to claim 1 containing a halogen containing rubber.

27. A rubber mixture according to claim 1 wherein the rubber of the mixture is free from halogen containing rubber.

28. A rubber mixture according to claim 27 wherein sulphur or a sulphur donor is present and is present in an amount of 0.1 to 15 parts by weight.

29. A rubber mixture according to claim 27 including 0.1 to 15 parts by weight of the oxide of zinc, magnesium or lead and 0.2 to 10 parts by weight of the fatty acid, benzoic acid or salicylic acid.

30. A rubber mixture according to claim 29 including 0.5 to 100 parts by weight of the plasticizer.

31. A rubber mixture according to claim 30 containing a fatty acid having 12 to 24 carbon atoms.

32. A rubber mixture according to claim 29 containing sulphur or a sulphur donor and also a fatty acid having 12 to 24 carbon atoms.

33. A rubber mixture according to claim 29 containing a sulphur donor.

34. A rubber mixture according to claim 27 including per 100 parts by weight of rubber 0.5 to 10 parts by weight of an organosilane of the formula

$$[R_n^2(R^3O)_{3-n}SiAlk-]_2S_x \qquad \text{II}$$

or

$$R_n^2(R^3O)_{3-n}Si-Alk-SH, \qquad \text{III}$$

where $R^2$ and $R^3$ are each an alkyl group with 1 to 4 carbon atoms, a cycloalkyl group with 5 to 8 carbon atoms or the phenyl group, n is 0, 1 or 2, Alk is a divalent aliphatic hydrocarbon group having 1 to 10 carbon atoms and x is a number from 2.0 to 8.0, or a hydrolysate or condensate of an organosilane of formula II or III.

35. A rubber mixture according to claim 34 wherein the mixture includes a premix of (a) an organosilane of formula I, a hydrolysate or condensate thereof and (b) a silicate filler, carbon black or a mixture of a silicate filler and carbon black.

36. A rubber mixture according to claim 35 wherein the mixture includes a premix of (a) an organosilane of formula I, a hydrolysate or condensate thereof and (b) a silicate filler, carbon black or a mixture of a silicate filler and carbon black.

37. A rubber mixture according to claim 36 wherein the premix contains on a basis of 100% of (a) plus (b) 5 to 70% (a) and 95 to 30% (b).

38. A rubber mixture according to claim 37 wherein the premix contains (a) and (b) in a weight ratio of about 1:1.

39. A rubber mixture according to claim 36 wherein the premix is free from carbon black.

40. A rubber mixture according to claim 36 wherein the premix contains carbon black.

41. A rubber mixture according to claim 36 wherein the organosilane is 3-chloropropyltriethoxysilane, a hydrolysate thereof or a condensate thereof.

42. A rubber mixture according to claim 27 wherein the organosilane is 3-chloropropyltriethoxysilane, a hydrolysate thereof or a condensate thereof.

43. A rubber mixture according to claim 42 wherein the organosilane is 3-chloropropyltriethoxysilane.

44. A rubber mixture according to claim 41 wherein the premix contains as at least a part of component (b) a silica filler obtained by precipitation in aqueous medium and having a specific surface of area between about 100 and 250 m$^2$/g.

45. A rubber mixture according to claim 44 wherein the premix is free from carbon black.

46. A rubber mixture according to claim 44 containing carbon black.

47. A rubber mixture according to claim 34 wherein the mixture includes a premix comprising (a) an organosilane of formula II or III or a hydrolysate or condensate thereof and (b) a silica obtained by precipitation in aqueous medium, a carbon black or a mixture of said silica and carbon black.

48. A rubber mixture according to claim 47 wherein the premix includes a bis-(3-triethoxysilylpropyl)-oligosulfide having 2 to 8 sulphur atoms.

49. A rubber mixture according to claim 48 wherein the premix contains said silica and the silica has a surface area of about 100 to 250 m²/g.

50. A rubber mixture according to claim 47 wherein the premix contains 0.2 to 10 parts by weight per 100 parts by weight of silica of a polyhydric alcohol or an epoxyalcohol.

51. A rubber mixture according to claim 50 wherein the polyhydric alcohol comprises ethylene glycol, propylene glycol, diethylene glycol, a polyethylene glycol, glycerine, hexanetriol or glycidol.

52. A process comprising forming the rubber mixtures of claim 1 into a moldable composition having the components thereof uniformly distributed therethrough and vulcanising the composition at a temperature between 100 and 250° C. for a time depending on the temperature between 200 and 1 minutes.

53. A process according to claim 52 wherein the rubber of the rubber mixture is free from halogen containing rubber.

54. A process according to claim 52 wherein there is used a rubber mixture including per 100 parts by weight of rubber 0.5 to 10 parts by weight of an organosilane of the formula

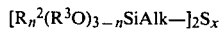   II or

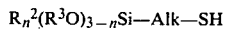   III where $R^2$ and $R^3$ are each an alkyl group with 1 to 4 carbon atoms, a cycloalkyl group with 5 to 8 carbon atoms or the phenyl group, n is 0, 1 or 2, Alk is a divalent aliphatic hydrocarbon group having 1 to 10 carbon atoms and x is a number from 2.0 to 8.0, or a hydrolysate or condensate of an organosilane of formula II or III.

55. A process according to claim 54 wherein the rubber of the rubber mixture is free from halogen containing rubber.

56. A process according to claim 52 wherein the mixture includes a premix of (a) an organosilane of formula I, a hydrolysate or condensate thereof and (b) a silicate filler, carbon black or a mixture of a silicate filler and carbon black.

57. A process according to claim 56 wherein the rubber of the rubber mixture is free from halogen containing rubber.

58. A process according to claim 56 wherein the premix comprises 3-chloropropyltriethoxysilane, a hydrolysate thereof or a condensate thereof and a silica obtained by precipitation in aqueous medium.

59. A process according to claim 58 wherein the rubber of the rubber mixture is free from halogen containing rubber.

60. A process according to claim 52 wherein rubber mixture employed is one including per 100 parts by weight of rubber 0.5 to 10 parts by weight of an organosilane of the formula

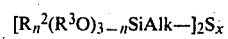   II or

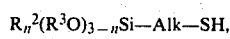   III where $R^2$ and $R^3$ are each an alkyl group with 1 to 4 carbon atoms, a cycloalkyl group with 5 to 8 carbon atoms or the phenyl group, n is 0, 1 or 2, Alk is a divalent aliphatic hydrocarbon group having 1 to 10 carbon atoms and x is a number from 2.0 to 8.0, or a hydrolysate or condensate of an organosilane of formula II or III, the hydrolysate or condensate thereof being present as a premix with a silica obtained by precipitation in aqueous medium, a carbon black or a mixture of said silica and carbon black.

61. A process according to claim 60 wherein the rubber of the rubber mixture is free from halogen containing rubber.

62. A process according to claim 60 wherein the premix comprises a bis-(3-triethoxysilylpropyl)-oligosulfide containing 2 to 6 sulphur atoms in the molecule, a hydrolysate or condensate thereof and a silica obtained by precipitation in aqueous medium and having a specific surface area between 100 and 250 m²/g.

63. A process according to claim 62 wherein the rubber of the rubber mixture is free from halogen containing rubber.

64. A tire comprising the rubber mixture of claim 1.

65. A tire according to claim 64 wherein the rubber of the rubber mixture is free from halogen containing rubber.

66. A tire tread comprising the rubber mixture of claim 1.

67. A tire tread according to claim 66 wherein the rubber of the rubber mixture is free from halogen containing rubber.

68. A show sole comprising the rubber mixture of claim 1.

69. A shoe sole according to claim 68 wherein the rubber of the rubber mixture is free from halogen containing rubber.

70. A rubber mixture according to claim 27 wherein the rubber is natural rubber, butadiene styrene copolymer, butadiene-acrylonitrile copolymer, butyl rubber, ethylene-propylene-non-conjugated polyene terpolymer or transpolypentenamer.

71. A rubber mixture according to claim 8 wherein the additional organosilane is one of formula II and the mixture is free from both sulphur and a sulphur donor.

72. A rubber mixture according to claim 34 wherein the additional organosilane is one of formula II and the mixture is free from both sulphur and a sulphur donor.

73. A rubber mixture according to claim 21 wherein the additional organosilane is one of formula II or a hydrolysate or a condensate thereof and the mixture is free from both sulphur and a sulphur donor.

74. A rubber mixture according to claim 47 wherein the additional organosilane is one of formula II or a hydrolysate or a condensate thereof and the mixture is free from both sulphur and a sulphur donor.

75. A rubber mixture according to claim 22 free from both sulphur and a sulphur donor.

76. A rubber mixture according to claim 48 free from both sulphur and a sulphur donor.

* * * * *